United States Patent [19]

Kondo et al.

[11] Patent Number: 5,314,522
[45] Date of Patent: May 24, 1994

[54] METHOD OF PROCESSING PHOTOSENSITIVE GLASS WITH A PULSED LASER TO FORM GROOVES

[75] Inventors: Nobuhiro Kondo; Hirokazu Ono, both of Tokyo, Japan

[73] Assignee: Seikosha Co., Ltd., Tokyo, Japan

[21] Appl. No.: 975,196

[22] Filed: Nov. 12, 1992

[30] Foreign Application Priority Data

Nov. 19, 1991 [JP] Japan .................................. 3-303440
Nov. 19, 1991 [JP] Japan .................................. 3-303442

[51] Int. Cl.$^5$ ............................................. C03B 32/02
[52] U.S. Cl. ........................................... 65/31; 65/33; 430/323; 430/330
[58] Field of Search .................... 430/323, 330; 65/33, 65/31, 30.1, 111

[56] References Cited

U.S. PATENT DOCUMENTS

| | | | |
|---|---|---|---|
| 2,628,160 | 2/1953 | Stookey | 65/111 |
| 3,473,927 | 10/1969 | Loose | 430/323 |
| 4,092,166 | 5/1975 | Olsen | 430/323 |

FOREIGN PATENT DOCUMENTS 56-121775 9/1981 Japan.

OTHER PUBLICATIONS

Barth, Karl–Abstract from Journal of American Ceramic Society Ceramic Abstracts, Oct. 1961 vol. 44 p. 238.
"Practical Surface Technologies", No. 11, 1988, Takashi Matsurra, Photo Chemically Machinable Glass Ceramics (Japanese language copy plus English translation thereof attached hereto).
Schott Product Information No. 4844/2e, Forturan Intricate-shaped glass and glass–ceramic components.

*Primary Examiner*—W. Gary Jones
*Assistant Examiner*—John R. Hoffmann
*Attorney, Agent, or Firm*—Jordan and Hamburg

[57] ABSTRACT

Method of processing a photosensitive glass used in the head of an ink jet printer, including the steps of exposing the glass by a XeCl excimer laser to write a desired pattern into the front surface of the glass, with the laser emitting plural pulses to the glass and the energy of each laser pulse being 1 to 50 mJ/cm$^2$ such that the exposed portions which will become crystallized portions do not extend through the thickness of the glass; thermally developing the exposed portions to crystallize the exposed portions; and etching away the crystallized portions so that grooves are formed in the glass according to the exposing pattern.

15 Claims, 8 Drawing Sheets

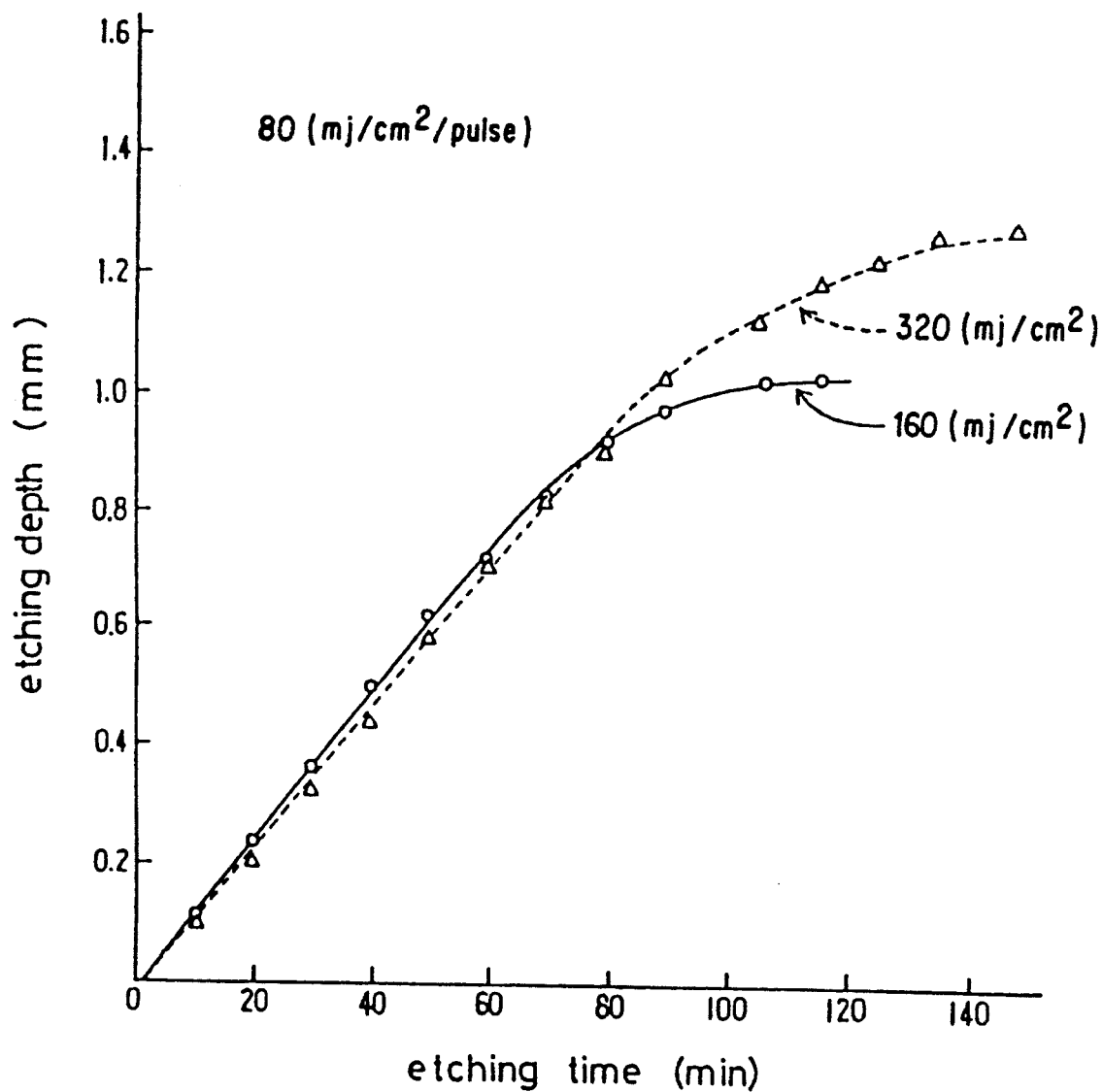

METHOD OF PROCESSING PHOTOSENSITIVE GLASS WITH A PULSED LASER TO FORM GROOVES

FIELD OF THE INVENTION

The present invention relates to a method of processing photosensitive glass by etching techniques.

BACKGROUND OF THE INVENTION

A conventional method consists in processing a sheet or plate of photosensitive glass by etching to form fine features on the head of an ink jet printer, for example. In particular, this method involves exposing desired portions of the photosensitive glass with ultraviolet radiation emitted by an ultraviolet lamp, heating the glass to 500°–700° C. to crystallize the exposed portions, and etching away the crystallized exposed portions with an etchant such as solution of hydrofluoric acid. A high-pressure mercury lamp is used as the ultraviolet lamp.

The conventional method is now described in further detail by referring to FIG. 10, where the ultraviolet lamp such as a high-pressure mercury lamp is indicated by 100. A plate of photosensitive glass 101 has a thickness less than 10 mm. The glass 101 is exposed with the ultraviolet radiation 100a emitted from the lamp 100 via a mask 102. The radiation penetrates through the glass plate from its front surface 101a to its rear surface 101b. When the glass plate is thermally developed, crystallized portions 103 extending from the front surface 101a to the rear surface 101b are formed. Therefore, during etching, the crystallized portions 103 are dissolved away by the etchant from the incident surface and from the opposite surface. This makes it impossible to write different shapes into opposite surfaces of the photosensitive glass plate 101.

In recent years, ink jet printer heads and other microelectronic devices have required microelectronic processing techniques. Such a head is fabricated from a thin plate or a sheet. It has been required that different fine features be written into opposite surfaces of the thin plate.

Accordingly, a new method has been developed. Specifically, tape is stuck to the rear surface 101b of the photosensitive glass plate 101 to prevent the etchant from touching the rear surface 101b. The front surface 101a is exposed to the etchant to form grooves. The etching depth is controlled according to the etching conditions such as the etching time, the temperature and the concentration of the etchant. However, the etch rate for the crystallized exposed portions is affected not only by the etching conditions but also by other factors such as the intensity of the exposing light and the thermal development conditions. Furthermore, the etch rate is affected by other various factors such as fatigue of the etchant, introduction of the dissolved photosensitive glass into the etchant during etching, and the manner in which the etchant touches the glass. Hence, it has been very difficult to control the etching depth.

Another problem is that the etched surfaces of the crystallized exposed portions a large surface roughness. In an ink passage formed in a surface of an ink jet printer head having large surface roughness, air bubbles introduced in the ink stagnate, thus adversely affecting the ink ejection characteristics.

Where photosensitive glass is etched in micromachining applications, large friction is produced. As a result, the mechanical driver portion cannot easily move.

In addition, it has been difficult to accomplish different etching depths in one etching process.

SUMMARY OF THE INVENTION

Accordingly, it is an object of the present invention to provide a method of writing different shapes into two opposite surfaces of a thin plate or sheet of photosensitive glass, easily controlling the etching depth, reducing the surface roughness of the etched surfaces, and accomplishing different etching depths in one etching process.

The above object is achieved in accordance with the teachings of the invention by a method comprising the steps of: exposing a photosensitive glass according to a desired pattern by an exposing means; thermally developing the exposed portions to crystallize them; and etching away the crystallized portions to form grooves in the glass according to the pattern. The total dosage given during the exposure step is so set that the crystallized portions which are easily etched do not extend through the glass in the direction of exposure.

Preferably, the exposing means is a pulsed laser producing light of a wavelength to which the photosensitive glass is sensitive. Preferably, the energy of each laser pulse is reduced so that plural laser pulses are emitted to the glass plate. In this way, the total dosage necessary to crystallize at least the front surface of the glass plate is obtained. The above-described laser is preferably a XeCl excimer laser. It is desired that the energy of each laser pulse be 1 to 50 mJ/cm$^2$.

The exposure step is carried out at plural positions on the surface of the photosensitive glass plate. Where the total dosage is made different among these positions, it is convenient to form grooves of different depths.

The present inventors have discovered that when a sheet of photosensitive glass is exposed preferably by an excimer laser and thermally developed, desired crystallized portions which can be etched at a higher rate than amorphous portions can be formed in such a way that the crystallized portions do not extend through the sheet of glass provided that the used dosage is the minimum dosage necessary to form the desired crystallized portions.

Also, the present inventors have discovered that when a sheet of photosensitive glass is exposed by an excimer laser and thermally developed, the total dosage producing desired crystallized portions depends on the energy of each laser pulse. That is, as the energy of each laser pulse is reduced, the total dosage needed to produce given crystallized portions increases.

Experimental data which have led us to reach the above conclusions are shown in FIGS. 11, 12, and 14. As shown in FIG. 11(A), a sheet of photosensitive glass was exposed by a XeCl excimer laser. The energy of each laser pulse was 1 mJ/cm$^2$. The number of emitted laser pulses was gradually increased, and the total dosage was increased. An etch rate of 10 μm/min. was obtained when 160 pulses were emitted, i.e., when the total dosage was 160 mJ/cm$^2$. FIG. 11(B) shows the case in which the energy of each laser pulse was 10 mJ/cm$^2$. In this case, an etch rate of 10 μm/min. was derived when 10 pulses were emitted, i.e., when the total dosage was 100 mJ/cm$^2$. FIG. 11(C) shows the case in which the energy of each laser pulse was 72 mJ/cm$^2$. In this case, an etch rate of 10 μm/min. or more was obtained when only one pulse was emitted, i.e., when the total dosage was 72 mJ/cm$^2$. In this way, as the energy of each laser pulse is reduced, more total dosage is needed to form given crystallized portions.

FIG. 12 shows the transmittance of a sheet of photosensitive glass at a depth of 1 mm from the front surface and the relative exposure sensitivity. Where a XeCl excimer laser emitting light of a wavelength of 308 nm to which the glass is sensitive is used, it can be seen from FIG. 12 that the transmittance at a depth of 1 mm from the front surface of the glass sheet is about 30%.

Therefore, when a sheet of photosensitive glass having a thickness of 1 mm is exposed, the percentage of the total dosage reaching the rear surface of the galls sheet is about 30%. Consequently, where the energy of each laser pulse is 1 mJ/cm$^2$ and the total dosage at the front surface is 200 mJ/cm$^2$, the total dosage at the rear surface is only 30% of the total dosage at the front surface, i.e., 60 mJ/cm$^2$. As the energy of each laser pulse is reduced, more total dosage is needed to form given crystallized portions. As can be seen from FIG. 11(A), the total dosage of 60 mJ/cm$^2$ is not sufficient to form given crystallized portions. The rear surface is hardly etched.

On the other hand, when the energy of each laser pulse is large, e.g., when the energy of each pulse is 72 mJ/cm$^2$ and the total dosage at the front surface is 216 mJ/cm$^2$, the total dosage at the rear surface is 65 mJ/cm$^2$. As shown in FIG. 11(C), the etch rate is in excess of 10 μm/min. It can be seen that the total dosage at the rear surface is sufficient to form the given crystallized portions.

Where the energy of each laser pulse is 72 mJ/cm$^2$ and the thickness of the glass sheet is 1 mm, the lithographic pattern appears at the rear surface even if only one pulse is emitted, i.e., the total dosage is 72 mJ/cm$^2$. In this way, although the total dosage at the front surface is substantially the same, given crystallized portions are formed at the rear surface by the larger energy of each pulse.

Like in the above-described case in which the energy of each pulse is 1 mJ/cm$^2$, the photosensitive glass can be exposed by controlling the energy of each laser pulse and the number of the emitted pulses, i.e., the total dosage at the front surface, in such a way that the total dosage at the front surface is just necessary to form given crystallized portions and that the required total dosage is not reached at the rear surface.

In this way, separate shapes can be written into opposite surfaces by exposure. Hence, the opposite surfaces can be etched into separate forms. Also, given crystallized portions can be formed up to desired depths by determining dosages.

As shown in FIG. 14, sheets of photosensitive glass were exposed with a XeCl excimer laser emitting laser pulses each having an energy of 80 mJ/cm$^2$. Some sheets were exposed at a total dosage of 160 mJ/cm$^2$. The others were exposed at a total dosage of 320 mJ/cm$^2$. All the sheets were etched at a shower pressure of 3kg/cm$^2$ with an etchant consisting of 6% solution of hydrofluoric acid. The temperature of the etchant was 25° C. Where the total dosage was 160 mJ/cm$^2$, the etching depth was about 1.0 mm. Where the total dosage was 320 mJ/cm$^2$, the etching depth was about 1.3 mm.

More specifically, where the energy of each laser pulse was 80 mJ/cm$^2$ and the thickness of the photosensitive glass was 1 mm, the glass is exposed even up to the rear surface even by one pulse. At locations where the depths from the front surface of the glass sheet exceed 1 mm, the transmittance is lower than 30%. Where the thickness of the glass sheet is 2 mm, the total dosage needed to form given crystallized portions is not obtained at the rear surface if the energy of each laser pulse is 80 mJ/cm$^2$ and if the total dosage is 320 mJ/cm$^2$.

Where the energy of each laser pulse is 80 mJ/cm$^2$ and the total dosage is 160 mJ/cm$^2$, given crystallized portions can be formed up to a depth of 1 mm from the front surface of the glass sheet. Where the total dosage is 320 mJ/cm$^2$, given crystallized portions can be formed up to a depth of 1.3 mm from the front surface of the glass sheet.

Thus, once a desired etching depth is determined, the total dosage to be illuminated is determined. Light is illuminated until this dosage is reached. Then, the sheet is thermally developed to form crystallized portions up to a desired depth, the crystallized portions being capable of being easily etched. A desired etching depth is obtained by etching the sheet.

Where the conventional high-pressure mercury lamp of 500 W is used, the glass surface must be illuminated with exposing light for about 15 minutes. The total dosage is as great as $4.5 \times 10$ J/cm$^2$. Of course, exposed portions which will become crystallized portions capable of being etched at a high etch rate and which extend to the rear surface as well as to the front surface are formed. FIG. 13 shows the emission spectrum of an ultrahigh-pressure mercury lamp USH-500D. As can be seen from this spectrum, it contains a large number of wavelengths other than the wavelength to which the photosensitive glass is sensitive. Therefore, the use of this lamp is wasteful. For this reason, great total dosage as described above is needed. If the total dosage is less than this value, exposed portions becoming crystallized portions capable of being etched at a high etch rate cannot be formed even at the front surface.

Other objects and features of the invention will appear in the course of the description thereof which follows.

BRIEF DESCRIPTION OF THE DRAWINGS

FIG. 14 is a graph showing the relation of etching depth in photosensitive glass to etching time.

DETAILED DESCRIPTION OF THE INVENTION

EXAMPLE 1

Figure 1:
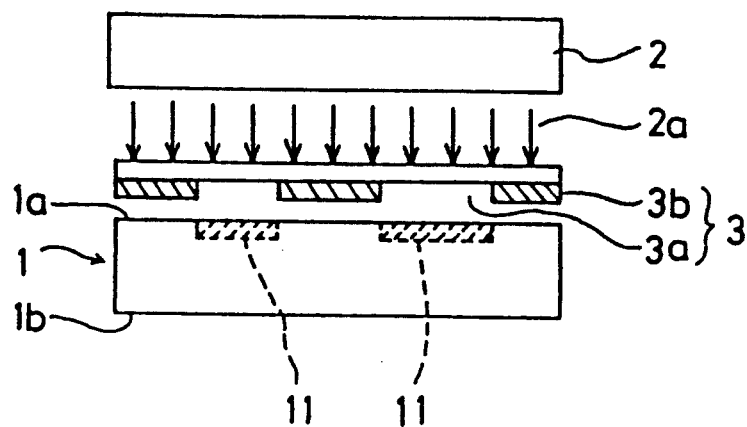
FIG. 1 is a front elevation of an etching apparatus, for showing the first exposure step of Example 1 of the invention.

The manufacturing steps for processing a sheet of photosensitive glass by a method according to the invention in order to fabricate a substrate forming a path of ink used in the head of an ink jet printer are first described successively with reference to FIGS. 1-5. Referring to FIG. 1, in the first step, the front surface 1a and the rear surface 1b of a sheet of photosensitive glass 1 having a thickness of 1 mm are both polished. Laser radiation 2a emitted from a laser 2 placed above the sheet of glass is directed to the front surface 1a of the glass sheet via a lithographic mask 3. The mask has a photolithographic pattern 3a consisting of apertures and corresponding to grooves formed in the front surface 1a of the glass sheet 1 and the other portions 3b which are shadowed.

A pulsed laser emitting wavelengths including wavelengths ranging from 150 to 400 nm to which the photosensitive glass is sensitive is used. In the present example, a XeCl excimer laser emitting light of a wavelength of 308 nm is employed. The energy of each pulse emitted from the XeCl excimer laser during exposure is 1 to 50 mJ/cm$^2$, preferably on the order of 10 mJ/cm$^2$. In the present example, the energy is 1 mJ/cm$^2$. About 200 pulses are emitted. The total dosage is on the order of 200 mJ/cm$^2$.

Exposed portions 11 corresponding to the lithographic pattern 3a are formed on the front surface 1a of the glass sheet 1 by this illumination. Since the energy of each pulse and the total dosage are both small, no exposed portions are formed at the rear surface 1b.

Figure 11A:
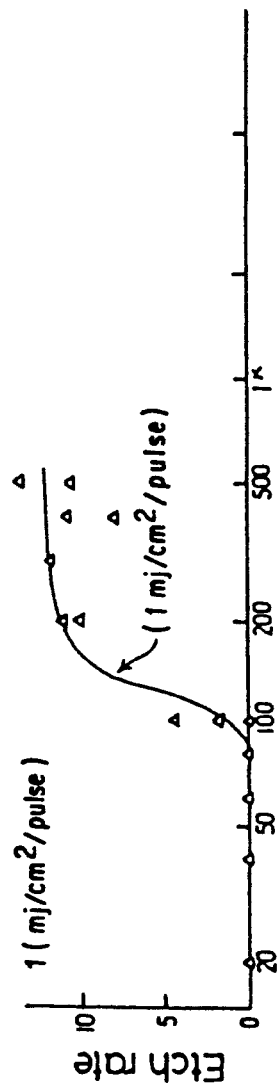
FIG. 11 shows graphs showing the relations of the rates at which sheets of photosensitive glass are etched to total dosage.
Figure 11B:
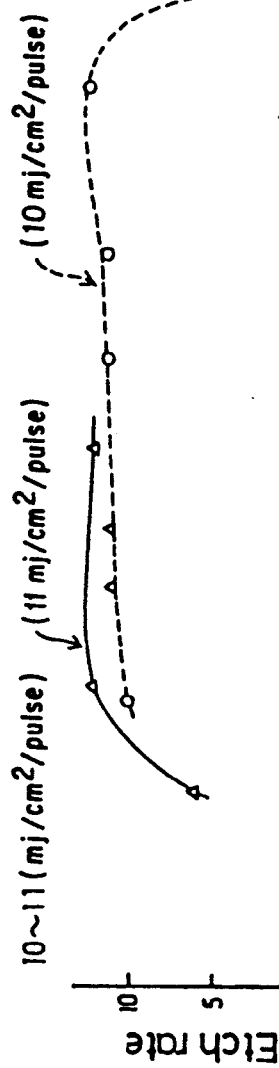
Figure 11C:
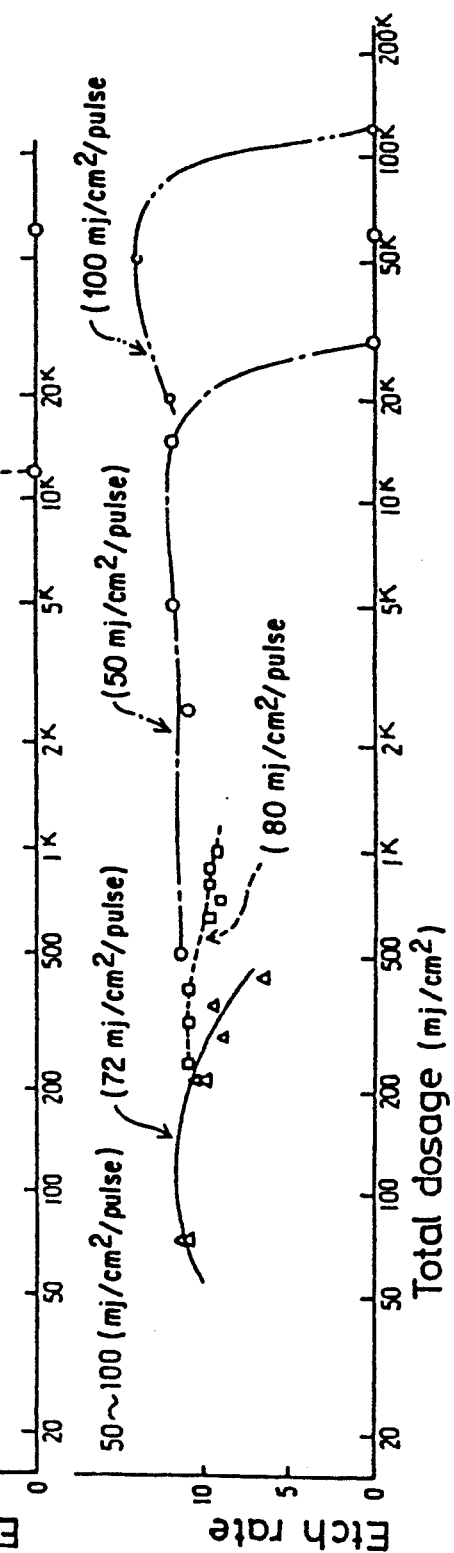
Figure 12:
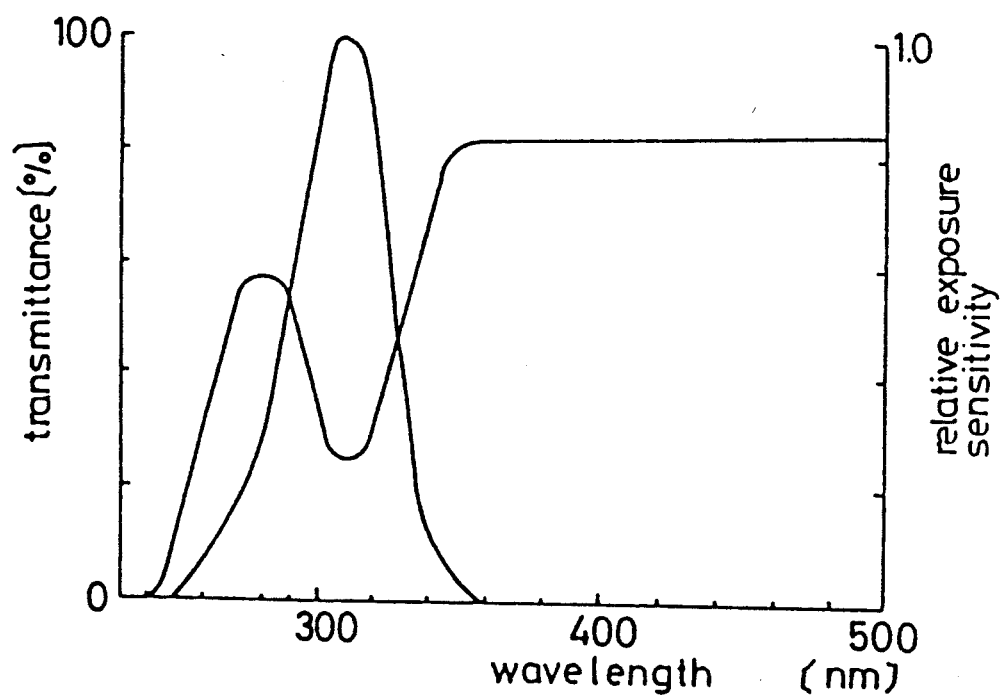
FIG. 12 is a graph in which the transmittance and the relative exposure sensitivity are plotted against wavelength.
Figure 13:
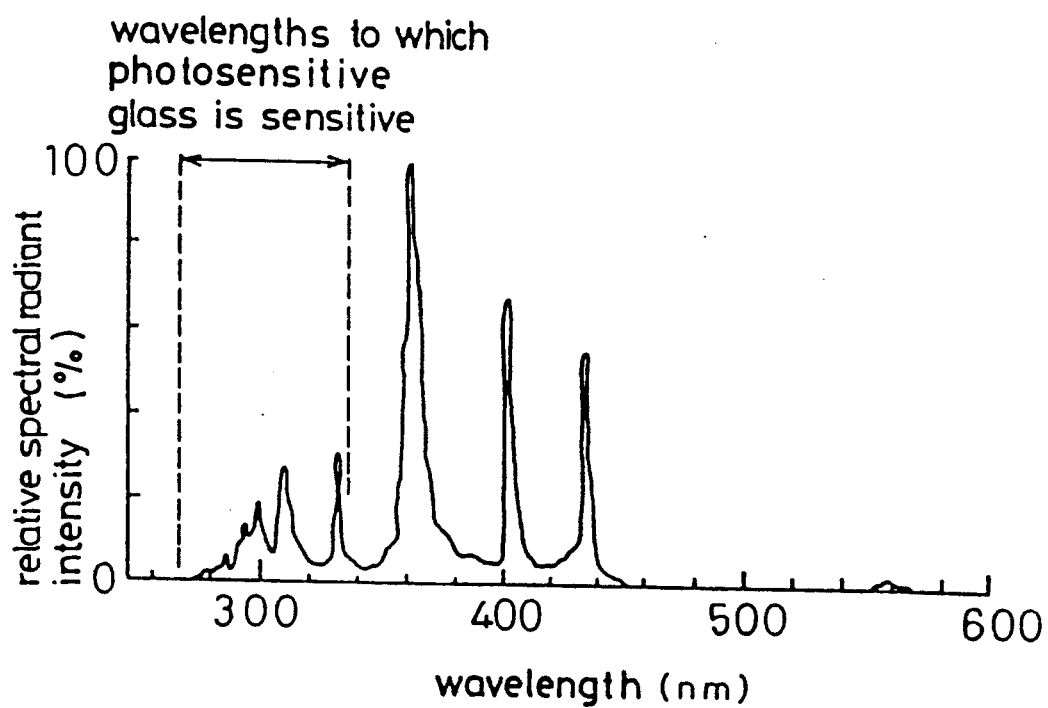
FIG. 13 is an emission spectrum of an ultrahigh-pressure mercury lamp.

Referring to FIG. 11(A), where the energy of each pulse is 1 mJ/cm$^2$, crystallized portions capable of being etched begin to be produced when the total dosage reaches 100 mJ/cm$^2$, i.e., when 100 pulses are emitted. Exposed portions capable of stably forming the crystallized portions are produced when the total dosage reaches 200 mJ/cm$^2$. The photosensitive glass sheet having a thickness of 1 mm absorbs about 30% of the light of a wavelength of 308 nm emitted by the XeCl excimer laser. If the total dosage at the front surface is 200 mJ/cm$^2$, the total dosage at the rear surface is about 60 mJ/cm$^2$. That is, the total dosage at the front surface is just sufficient to form given crystallized portions. However, the required total dosage is not reached at the rear surface. Exposed portions becoming crystallized portions capable of being etched at a high rate are not formed at the rear surface.

Figure 2:
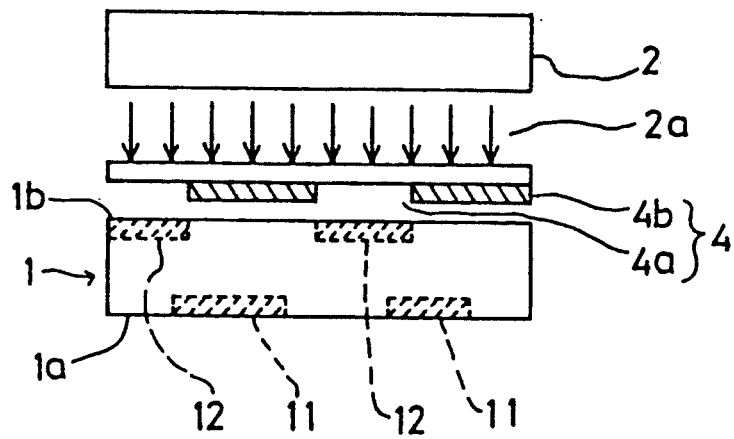
FIG. 2 is a front elevation similar to FIG. 1, but showing the second exposure step of Example 1.

Referring to FIG. 2, in the second step, the sheet of photosensitive glass 1 is turned upside down. The excimer laser 2 emits laser radiation 2a to the rear surface 1b of the glass sheet via a lithographic mask 4. The mask 4 has a photolithographic pattern 4a of a different shape to be written into the rear surface 1b of the glass sheet 1. The remaining portions of the mask 4 form shadowed portions 4b. During the exposure, the energy of each pulse emitted from the excimer laser is 1 mJ/cm$^2$. About 200 pulses are emitted. The total dosage is 200 mJ/cm$^2$. Exposed portions 12 are formed at the rear surface 1b. In the same way as the foregoing, the opposite side, or the front surface 1a, is so exposed that crystallized portions capable of being etched at a high rate are not produced.

Figure 3:
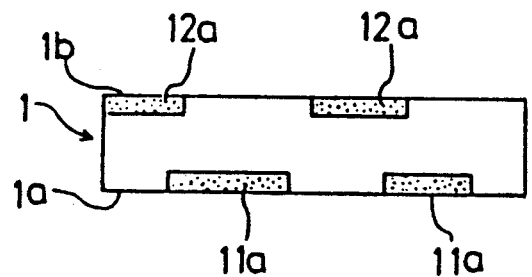
FIG. 3 is a front elevation of a sheet of photosensitive glass which has undergone the thermal development step of Example 1.

Referring to FIG. 3, in the third step, the glass sheet 1 is heated to about 500°-700° C. Then, the sheet is thermally developed to crystallize the exposed portions 11 and 12, thus forming crystallized portions 11a and 12a. Those portions of the glass sheet 1 which are deeper than the crystallized portions 11a and 12a are amorphous.

Figure 4:
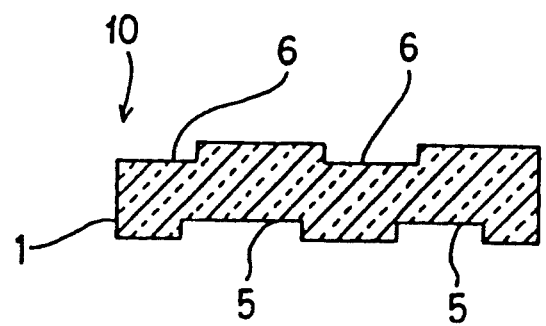
FIG. 4 is a cross-sectional view of the sheet of photosensitive glass shown in FIG. 3, but in which the sheet has undergone the etching step.

Referring to FIG. 4, in the fourth step, this glass sheet 1 is showered with an etchant consisting of 5-10% solution of hydrofluoric acid to etch the sheet. Thus, the crystallized portions 11a and 12a are etched away. In this way, grooves 5 and 6 are formed. As a result, a substrate 10 provided with ink channels used in the head of an ink jet printer is formed, the substrate 10 having the grooves 5 and 6 forming the ink channels.

Figure 5:
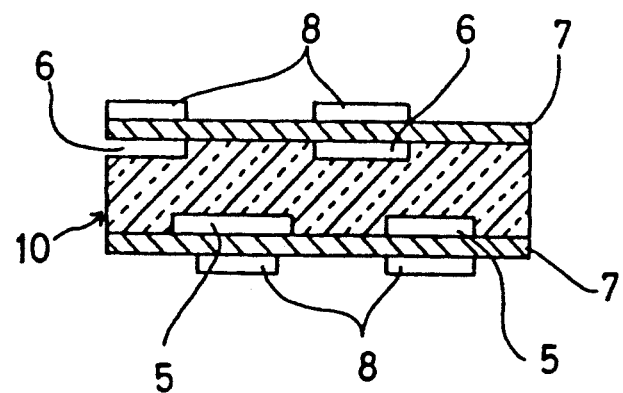
FIG. 5 is a cross-sectional view of an ink jet printer head using the sheet of photosensitive glass fabricated by the method of Example 1.

In the ink jet printer head shown in FIG. 5, diaphragms 7 are stuck to the front and rear surfaces of the ink passage substrate 10 fabricated from photosensitive glass as described above. Piezoelectric elements 8 are mounted at given positions on the outer surfaces of the diaphragms. Ink is supplied into the grooves 5 and 6 from an ink supply means (not shown). When a voltage is applied to the piezoelectric elements 8, the diaphragms 7 are deformed inwardly to force the ink existing in the fluid passages out of ink ejection holes (not shown). As a result, dots are printed.

EXAMPLE 2

A method of forming grooves having different depths in the surface of a sheet of photosensitive glass is next described by referring to FIGS. 6-9.

Figure 6:
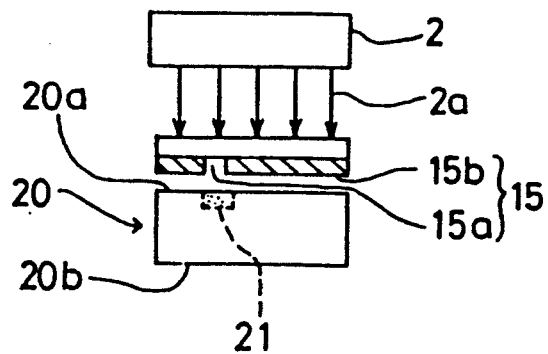
FIG. 6 is a front elevation of an etching apparatus, for showing the first exposure step of Example 2 of the invention.

Referring to FIG. 6, in the first exposure step, the front surface 20a of a plate of photosensitive glass 20 having a thickness of 3 mm is polished. The same laser 2 as used in Example 1 is placed above the glass plate. The laser 2 emits laser radiation 2a to the front surface 20a of the glass plate via a lithographic mask 15. A lithographic pattern 15a consisting of apertures and indicating the shape of shallow grooves formed in the front surface of the glass plate 20 is formed on the mask 15. The remaining portions 15b are shadowed. The used laser is a XeCl excimer laser emitting light of a wavelength of 308 nm in the same way as in Example 1. The energy of each laser pulse is 80 mJ/cm$^2$. About 2 pulses are emitted. The total dosage is approximately 160 mJ/cm$^2$.

Exposed portions 21 are formed in the front surface 20a of the glass plate 20 according to the lithographic pattern 15a by this illumination. Since the total dosage is small, the formed exposed portions do not reach the rear surface 20b but terminate at a given depth; the exposed portions do not extend deeper than the given depth.

Figure 7:
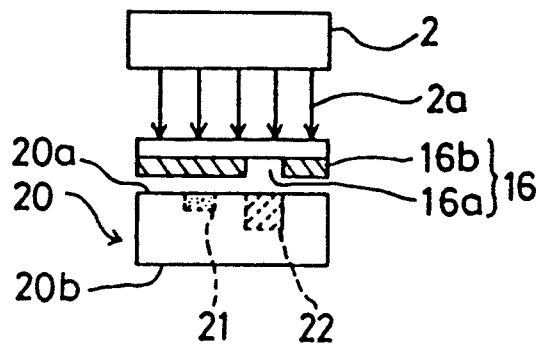
FIG. 7 is a front elevation similar to FIG. 6, but showing the second exposure step of Example 2.

Referring to FIG. 7, in the second exposure step, the laser radiation 2a is directed to the front surface 20a of the glass plate via a lithographic mask 16. A lithographic pattern 16a indicating the pattern of shallow grooves formed at different positions in the front surface of the glass plate 20 is formed on the mask 16. The remaining portions 16b of the mask 16 are shadowed. In this illumination, the energy of each pulse of the laser radiation 2a is 80 mJ/cm$^2$. About 4 pulses are emitted. The total dosage is approximately 320 mJ/cm$^2$.

Exposed portions 22 are formed in the front surface 20a of the glass plate 20 according to the lithographic pattern 16a by this illumination process. Since the total dosage is greater than the total dosage in the first exposure step, the exposed portions extend deeper than the exposed portions 21 but do not reach the rear surface 20b. The exposed portions terminate at a given depth.

Figure 8:
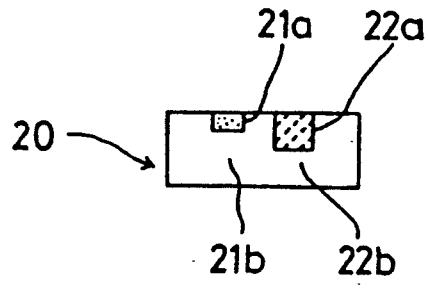
FIG. 8 is a front elevation of a sheet of photosensitive glass which has undergone the thermal development step of Example 2.

Referring to FIG. 8, the photosensitive glass plate 20 is heated to 500°–700° C. to thermally develop it. This crystallizes the exposed portions 21 and 22. As a result, crystallized portions 21a and 22a are formed. Those portions 21b and 22b which are located under the crystallized portions 21a and 22a are amorphous.

Figure 9:
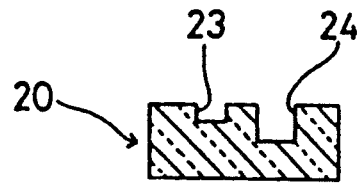
FIG. 9 is a cross-sectional view of the sheet of photosensitive glass shown in FIG. 8, but in which the sheet has undergone the etching step.
Figure 10:
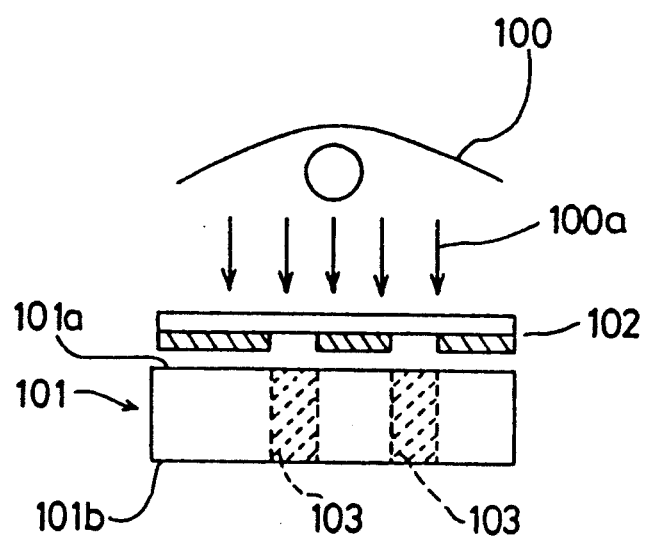
FIG. 10 is a front elevation of an exposure apparatus, illustrating the prior art exposure step.

Referring to FIG. 9, the glass plate 20 is etched with an etchant consisting of 6% solution of hydrofluoric acid at a shower pressure of 3 kg·f/cm$^2$. The temperature of the solution is maintained at 25° C. Thus, the crystallized portions 21a and 22a are etched away to form grooves 23 and 24. As shown in FIG. 14, the grooves 23 and 24 have depths of about 1.0 mm and 1.3 mm, respectively. In this manner, the grooves of different depths are formed in a single etching process.

In the etching step of the above-described example, the amorphous portions under the crystallized portions 21a and 22a are slightly etched. However, the rate at which these amorphous portions are etched is approximately one twentieth of the etch rate for the crystallized portions. The total dosage should be determined, taking account of this etching depth.

In the above Examples 1 and 2, an XeCl excimer laser is used as an exposing means. Other lasers such as a XeF laser emitting light of a wavelength of 351 nm, a KrF laser emitting light of a wavelength of 248 nm, an ArF excimer laser emitting light of a wavelength of 193 nm, and an N$_2$ laser emitting light of a wavelength of 337 nm may also be used. Furthermore, in a laser system in which the fundamental oscillation wavelength of a Nd$^+$: YAG (yttrium aluminum garnet) laser, a dye laser, a Kr ion laser, an Ar ion laser, or a copper vapor laser is converted into ultraviolet radiation by a nonlinear optical device or the like may be used. Additionally, the exposing means is not restricted to lasers. An ultraviolet lamp such as an excimer lamp or ultrahigh-pressure mercury lamp may also be employed.

As described thus far, in accordance with the present invention, when a photosensitive glass is exposed, crystallized portions capable of being etched easily can be formed in the sheet or plate up to a desired depth not extending through the glass by appropriately selecting the total dosage. Hence, different groove patterns can be written into the two opposite surfaces of the glass having a small thickness. Since amorphous portions are produced by etching, the etched surfaces are made smooth. This is advantageous to the ink passages in an ink jet printer head or to micromachining. Further, grooves of different depths can be formed by one etching process by carrying out plural exposure steps while varying the dosage. Consequently, glass can be processed with greater ease.

Although the present invention has been fully described by way of example with reference to the accompanying drawings, it is to be understood that various changes and modifications will be apparent to those skilled in the art. Therefore, unless such changes and modifications depart from the scope of the invention, they should be construed as being included therein.

What is claimed is:

1. A method of forming grooves in a photosensitive glass article comprising the steps of:
    exposing a photosensitive glass article to a pulsed laser emitting radiation, including radiation to which said photosensitive glass article is sensitive such that said radiation forms an exposed groove pattern in said photosensitive glass article;
    thermally developing said exposed photosensitive glass article to crystallize said exposed groove pattern;
    etching said crystallized groove pattern to thereby form grooves in said photosensitive glass article;
    said pulsed laser emitting energy pulses with each pulse having an intensity such that a total number of energy pulses determine a total energy dosage; and
    controlling the depth of said grooves by controlling the intensity of each of said energy pulses and controlling the total energy dosage.

2. A method according to claim 1, wherein said pulsed laser is an XeCl excimer laser.

3. A method according to claim 1, wherein the intensity of each energy pulse emitted from said pulsed laser is 1 to 50 mJ/cm$^2$.

4. A method according to claim 1, wherein said photosensitive glass article is a glass sheet having a front side and a reverse side, said exposing step being carried out in plural positions on the front side of the glass sheet at different total energy dosages.

5. A method according to claim wherein said photosensitive glass article has an obverse side and a reverse side;
    said exposing step comprising exposing said observe side to said pulsed laser radiation such that said exposed groove pattern extends from said obverse side to a position spaced from said reverse side;
    said photosensitive glass material having an underlying portion between said exposed groove pattern and said reverse side which is exposed to said pulsed laser radiation during said exposing step to form said exposed groove pattern;
    said exposed groove pattern having an etch rate at which said etching step is effected, said underlying portion having an etch rate;
    said controlling step comprising controlling the intensity of each of said energy pulses and controlling the total energy dosage to obtain an etch rate for said exposed groove pattern which is greater than the etch rate of said underlying portion.

6. A method according to claim 5 wherein the etch rate of said underlying portion is approximately one-twentieth of the etch rate of said exposed groove pattern.

7. A method of producing a groove to a desired depth in a photosensitive glass article comprising:
    determining the desired depth of a groove in a photosensitive glass article;

providing a pulsed laser emitting radiation, including radiation to which the photosensitive glass article is sensitive, and which emits energy pulses with each pulse having an intensity such that the total number of pulses determines a total energy dosage;

selecting the intensity of each energy pulse and the total energy dosage that will produce an exposed groove portion in said photosensitive glass article which, when subsequently etched in the following etching step, will have a depth equal to said desired depth of groove;

exposing said photosensitive glass article with said pulsed laser radiation at said selected intensity of energy pulses and total energy dosage to produce said exposed groove portion in said photosensitive glass article;

thermally developing said photosensitive glass article to crystallize said exposed groove portion; and etching said crystallized portion to obtain said groove with said desired depth.

8. A method according to claim 7 wherein said photosensitive glass article has a obverse side and a reverse side;

said exposing step comprising exposing said observe side to said pulsed laser radiation such that said exposed groove portion extends from said obverse side to a position spaced from said reverse side;

said photosensitive glass article having an underlying portion between said exposed groove pattern and said reverse side which is exposed to said pulsed laser radiation during said exposing step to form said exposed groove pattern;

said exposed groove pattern having an etch rate at which said etching step is effected, said underlying portion having an etch rate;

said controlling step comprising controlling the intensity of each of said energy pulses and the total energy dosage to obtain an etch rate for said exposed groove pattern which is greater than the etch rate of said underlying portion.

9. A method of making a groove in a photosensitive glass article used for the passage of ink in an ink jet printer head comprising the steps of:

providing a photosensitive glass article to be used as part of said ink jet printer head;

exposing said photosensitive glass article to a pulsed laser emitting radiation, including radiation to which said photosensitive glass article is sensitive such that said radiation forms an exposed groove pattern in said photosensitive glass article;

thermally developing said exposed photosensitive glass article to crystallize said exposed groove pattern;

etching said crystallized groove pattern to thereby form a groove in said photosensitive glass article;

said pulsed laser emitting energy pulses with each pulse having an intensity such that a total number of energy pulses determine a total energy dosage; and controlling the depth of said groove by controlling the intensity of each of said energy pulses and controlling said total energy dosage.

10. A method according to claim 9 wherein said photosensitive glass article has an obverse side and a reverse side;

said exposing step comprising exposing said observe side to said pulsed laser radiation such that said exposed groove pattern extends from said obverse side to a position spaced from said reverse side;

said photosensitive glass article having an underlying portion between said exposed groove pattern and said reverse side which is exposed to said pulsed laser radiation during said exposing step to form said exposed groove pattern;

said exposed groove pattern having an etch rate at which said etching step is effected, said underlying portion having an etch rate;

said controlling step comprising controlling the intensity of each of said energy pulses and controlling the total energy dosage to obtain an etch rate of said exposed groove pattern which is greater than the etch rate of said underlying portion.

11. A method of forming grooves of different depths in a photosensitive glass article comprising:

a first exposing step of exposing one section of a photosensitive glass article to radiation of a pulse laser such that said radiation forms a first exposed groove pattern in said photosensitive glass article;

a second exposing step of exposing another section of said photosensitive glass article to radiation of said pulsed laser such that said latter radiation forms a second exposed groove pattern in said photosensitive glass article;

thermally developing simultaneously said first and second groove patterns in said photosensitive glass to crystallize said first and second groove patterns;

etching substantially simultaneously said crystallized first and second groove patterns to thereby form first and second grooves respectively in said photosensitive glass article;

said pulsed laser emitting energy pulses with each pulse showing an intensity such that a total number of energy pulses determine a total energy dosage; and controlling the depth of said first and second groove to obtain a different depth of groove for each of said first and second grooves by controlling the intensity of each of said energy pulses and controlling the total energy dosage in each of said first and second exposing steps.

12. A method according to claim 11 further comprising controlling the depth of said first groove by utilizing a first total energy dosage during said first exposing step and controlling the depth of said second groove by utilizing a second total energy dosage during said second exposure step, said second total energy dosage being greater than said first total energy dosage, said second groove having a depth greater than the depth of said first groove.

13. A method according to claim 12 wherein the intensity of each energy pulse of said first and second exposing steps is substantially the same.

14. A method according to claim 12 wherein the intensity of each energy pulse of said first exposing step is different from the intensity of each energy pulse of said second exposing step.

15. A method of forming grooves on opposite sides of a photosensitive glass article in which said article has an observe side and a reverse side comprising:

a first exposing step of exposing a section of the obverse side of a photosensitive glass article to radiation of a pulse laser to form a first exposed groove pattern in said obverse side of said photosensitive glass article;

a second exposing step of exposing a section of the reverse side of said photosensitive glass article to radiation of said pulsed to form a second exposed groove pattern in said reverse side of said photosensitive glass article;

thermally developing simultaneously said first and second exposed groove patterns in said photosensitive glass article to crystallize said first and second exposed groove patterns;

etching substantially simultaneously said crystallized first and second exposed groove patterns to thereby form first and second grooves respectively in said obverse and reverse sides of said photosensitive glass article;

said pulsed laser emitting energy pulses with each pulse having an intensity such that a total number of energy pulses determine a total energy dosage; and controlling the depth of said first and second grooves by controlling the intensity of each of said energy pulses and controlling the total energy dosage in each of said first and second exposing steps.

* * * * *